(12) United States Patent
Ohtsu

(10) Patent No.: US 11,312,327 B2
(45) Date of Patent: Apr. 26, 2022

(54) VEHICLE SEAT AND METHOD FOR MANUFACTURING THE SAME

(71) Applicant: TOYOTA BOSHOKU KABUSHIKI KAISHA, Aichi-ken (JP)

(72) Inventor: Hideki Ohtsu, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/168,643

(22) Filed: Feb. 5, 2021

(65) Prior Publication Data

US 2021/0245697 A1 Aug. 12, 2021

(30) Foreign Application Priority Data

Feb. 7, 2020 (JP) .............................. JP2020-019423

(51) Int. Cl.
*B60R 21/207* (2006.01)
*B60R 21/2165* (2011.01)
*B60N 2/58* (2006.01)

(52) U.S. Cl.
CPC .......... *B60R 21/207* (2013.01); *B60N 2/5883* (2013.01); *B60N 2/5891* (2013.01); *B60R 21/2165* (2013.01)

(58) Field of Classification Search
CPC .... B60R 21/207; B60N 2/5883; B60N 2/5891
See application file for complete search history.

(56) References Cited

U.S. PATENT DOCUMENTS

| | | | | |
|---|---|---|---|---|
| 6,045,151 A | * | 4/2000 | Wu | B60R 21/207 280/728.3 |
| 6,293,580 B1 | * | 9/2001 | Lachat | B60R 21/207 280/728.3 |
| 7,134,685 B2 | * | 11/2006 | Panagos | B60R 21/201 280/730.2 |
| 8,398,112 B2 | * | 3/2013 | Tracht | B60R 21/2176 280/728.2 |
| 10,611,276 B2 | * | 4/2020 | Suzuki | B60N 2/5883 |

FOREIGN PATENT DOCUMENTS

| | | | | |
|---|---|---|---|---|
| GB | 2527824 A | * | 1/2016 | ........... B60R 21/207 |
| JP | 2019-202667 | | 11/2019 | |
| WO | WO-03072485 A1 | * | 9/2003 | ........... B60N 2/5883 |

* cited by examiner

*Primary Examiner* — Faye M Fleming
(74) *Attorney, Agent, or Firm* — Greenblum & Bernstein, P.L.C.

(57) ABSTRACT

A vehicle seat includes a seat pad and a seat cover including a first part and a second part. The seat cover is provided with: a sewing line that sews the first part and the second part together; and an outline stitch that extends in parallel to the sewing line and that is located on one side of the sewing line. A belt-shaped plate is sewn to a first seam allowance and a first main body of the first part by the outline stitch in a position on an end side of the first seam allowance relative to the sewing line. The seat pad is covered with the seat cover in a state where the belt-shaped plate extends beyond the sewing line toward the second part and where the belt-shaped plate presses a second seam allowance to abut against a second main body of the second part.

6 Claims, 6 Drawing Sheets

VEHICLE SEAT AND METHOD FOR MANUFACTURING THE SAME

CROSS-REFERENCE TO RELATED APPLICATIONS

This application claims priority from Japanese Patent Application No. 2020-019423 filed on Feb. 7, 2020, the entire contents of which are incorporated herein by reference.

TECHNICAL FIELD

The present disclosure relates to a vehicle seat and a method for manufacturing the vehicle seat.

BACKGROUND

In a vehicle seat in the related art, a plurality of parts of a seat cover that is a surface cover member are integrated as a single part by sewing lines. Here, an outline stitch that is separately provided from the sewing line may be provided as a design line extending in parallel to the sewing line. Such an outline stitch may be provided on both sides of the sewing line or provided along only one side of the sewing line. The term "outline stitch" refers to a sewing line whose seam appears on a surface.

In a technology described in JP-A-2019-202667, an outline stitch is provided in parallel to a sewing line of two parts (i.e., first part and second part) on only one side of the sewing line. In such a case, a seam allowance of the first part on which the outline stitch is provided is fixed in a state of being abutted against a main body of the first part by the outline stitch. However, a seam allowance of the second part on which no outline stitch is provided is rotatable relative to a main body of the second part about the sewing line and is not fixed to the main body of the second part. Accordingly, when the seat cover is covered on a seat pad that is a cushion body, the seam allowance that is not fixed to the main body is disposed with no constraints in the periphery of the sewing line. As a result, the sewing line may irregularly rise or recess, which may impair the appearance quality.

SUMMARY

Given such a problem, an object of the present disclosure is to provide a vehicle seat having a good appearance and including a seat cover provided with an outline stitch in parallel to a sewing line that integrates parts of the seat cover, on only one side of the sewing line, and a method for manufacturing the vehicle seat.

An aspect of the present disclosure is a vehicle seat including: a seat pad that is a cushion body; and a seat cover including a plurality of parts that cover the seat pad and that are integrated as a single part, the plurality of parts including a first part and a second part, in which the seat cover includes a portion provided with: a sewing line that sews the first part and the second part together; and an outline stitch that extends in parallel to the sewing line and that is located on one side of the sewing line, the first part includes a first main body and a first seam allowance that is a seam allowance at the sewing line, and the second part includes a second main body and a second seam allowance that is a seam allowance at the sewing line, a belt-shaped plate is sewn to the first seam allowance and the first main body by the outline stitch in a position on an end side of the first seam allowance relative to the sewing line, and the seat pad is covered with the seat cover in a state where the belt-shaped plate extends beyond the sewing line from the end side of the first seam allowance toward the second part and where the belt-shaped plate presses the second seam allowance to abut against the second main body.

Another aspect of the present disclosure is a method for manufacturing a vehicle seat including a seat pad that is a cushion body and a seat cover having a plurality of parts that cover the seat pad and that are integrated as a single part, the plurality of parts including a first part and a second part, the method including: sewing the first part and the second part together with a sewing line at a portion of the seat cover, the first part including a first main body and a first seam allowance that is a seam allowance at the sewing line, the second part including a second main body and a second seam allowance that is a seam allowance at the sewing line; providing an outline stitch that sews a belt-shaped plate to the first seam allowance and the first main body in a position on an end side of the first seam allowance relative to the sewing line, the belt-shaped plate being sewn in parallel with the sewing line; and covering the seat pad with the seat cover in a state where the belt-shaped plate extends beyond the sewing line from the end side of the first seam allowance toward the second part and where the belt-shaped plate presses the second seam allowance to abut against the second main body.

DETAILED DESCRIPTION

FIGS. 1 to 6 illustrate an embodiment of the present disclosure. The embodiment is an example in which the present disclosure is applied to an automobile seat 1. In these drawings, directions of an automobile and the automobile seat 1 when the automobile seat 1 is attached to the automobile are illustrated by arrows. In the following description, descriptions of directions are made with reference to these directions. The automobile seat 1 according to the present embodiment includes a seat cushion 2 serving as a seat portion, a seat back 10 serving as a backrest, and a headrest (not illustrated) that supports a head. The seat cushion 2 and the headrest have known configurations. Accordingly, descriptions thereof will be omitted and the seat back 10 will be described. Here, the automobile seat 1 corresponds to a "vehicle seat" in the claims.

Figure 1:
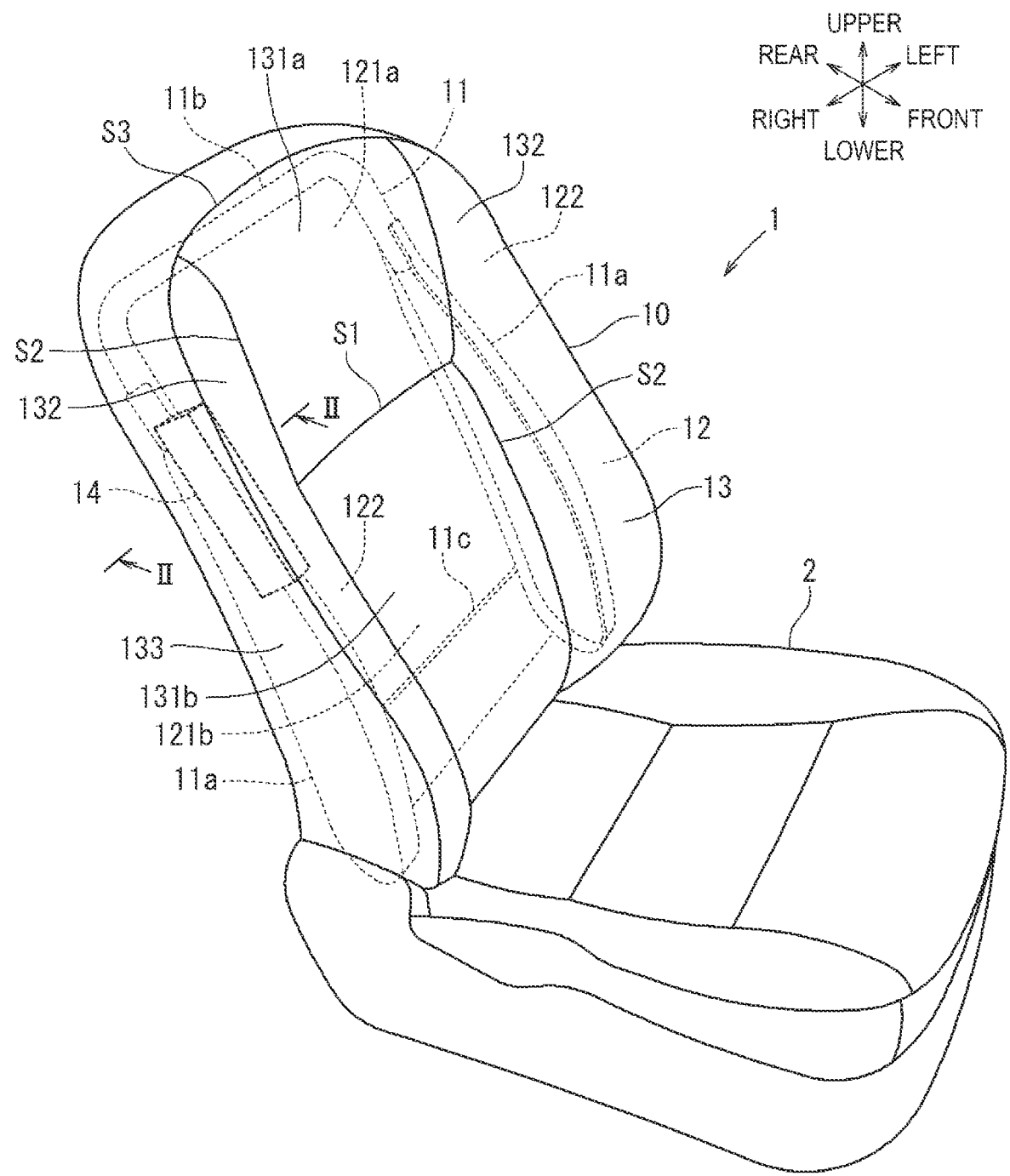
FIG. 1 is a perspective view of an automobile seat according to an embodiment of the present disclosure.
Figure 2:
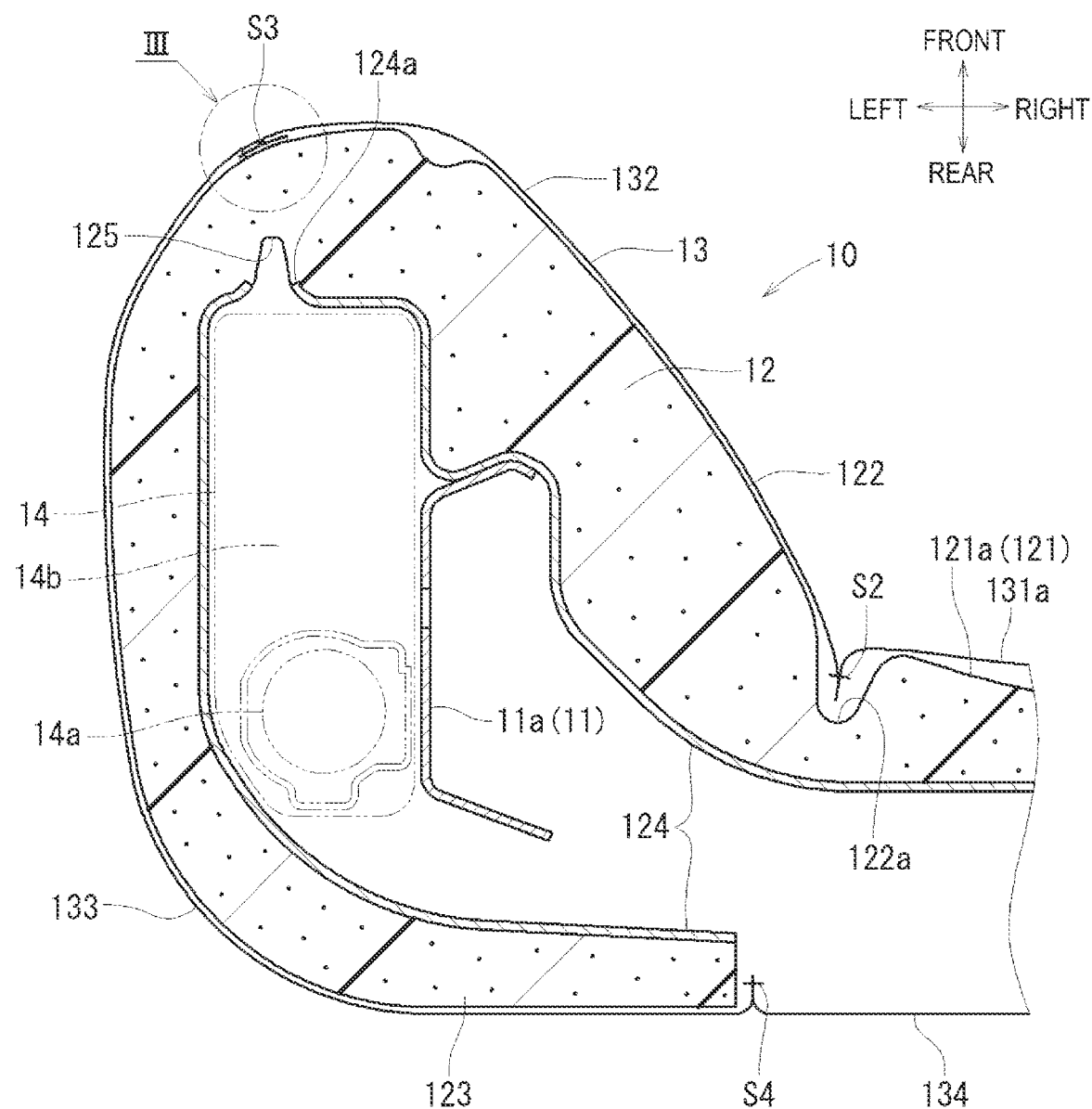
FIG. 2 is a cross-sectional view taken along a line II-II in FIG. 1.

As illustrated in FIGS. 1 and 2, the seat back 10 has a structure in which a back pad 12 made of urethane foam that is a cushion member is placed on a back frame 11 constituting a frame of the seat back 10, and the back pad 12 is covered with a back cover 13 that is a surface cover member from above.

The back frame 11 is a member formed in a rectangular frame shape in a front view, and includes a pair of left and right side frames 11*a* that are pressed members each having a substantially U shape in a cross-section and extend in an upper-lower direction, an upper frame 22b that is a pipe member having an inverted U shape in a front view, and a lower panel 11c that is a pressed member having a rectangular shape in a front view. Upper portions of the pair of left and right side frames 11a are coupled by the upper frame 11b. Lower portions of the pair of left and right side frames 11a are coupled by the lower panel 11c. An airbag module 14 is attached to a right side surface (seat outer side surface) of the upper portion of the right side frame 11a. Lower end portions of the pair of left and right side frames 11a are coupled to a rear end portion of a cushion frame (not illustrated) via a recliner (not illustrated) so that an inclination of the back frame 11 relative to the cushion frame is adjustable. The airbag module 14 includes an inflator 14a that generates gas and a folded airbag 14b. The inflator 14a is fixed to the side frame 11a so that the airbag module 14 is attached to the side frame 11a.

As illustrated in FIGS. 1 and 2, the back pad 12 includes a seat surface portion 121 having a concave seat surface against which a back of a seated person mainly abuts, and a bank portion 122 that supports sides of the seated person. The seat surface portion 121 includes a central upper portion 121a that supports an upper central part of the back of the seated person and a central lower portion 121b that supports a lower central part of the back of the seated person. The bank portion 122 is located on both left and right sides of the seat surface portion 121 and has a convex shape protruding forward from the seat surface portion 121. A surrounding portion 123 is provided at a peripheral rear end portion of each of left and right bank portions 122 and extends to wind back toward a seat inner side. A surrounding portion (not illustrated) is provided at upper and lower peripheral rear end portions of the seat surface portion 121 and extends to wind back toward the seat inner side. The back pad 12 is attached to the back frame 11 in a state in which left and right surrounding portions 123 and upper and lower surrounding portions cover the back frame. The back pad 12 and the hack cover 13 correspond to a "seat pad" and a "seat cover" in the claims, respectively.

A back surface member 124 made of nonwoven fabric is integrally bonded to a surface of the back pad 12 that is opposite to the seat surface. The back surface member 124 is disposed in a molding mold in advance during foam molding of the back pad 12 to be impregnated and cured by a resin material, thereby being integrated with the back pad 12. The back surface member 124 has a function of preventing damage such as cracking of the back pad 12 when the back surface of the back pad 12 comes into contact with a spring member of the back frame 11. When the back pad 12 is attached to the back frame 11, a groove 125 is provided on the back surface of the back pad 12 in a position where the groove 125 faces a front surface of the airbag 14b of the airbag module 14. The back surface member 124 is cut out at an opening end portion of the groove 125 so that an opening 124a is provided. When supplied with gas from the inflator 14a, the airbag 14b is expandable by rupturing the back pad 12 from the opening 124a and the groove 125.

As illustrated in FIGS. 2 to 5, the back cover 13 is formed in a bag shape by sewing cutout surface cover member parts together. An example of the surface cover member includes a planar body in which a surface cover 13a such as fabric or leather, a slab pad 13b made of urethane, and a back base cloth 13c made of cotton cloth or nonwoven fabric are laminated in this order (see FIG. 3). Examples of the surface cover member parts include the following five types: (1) a central upper cover part 131a corresponding to the central upper portion 121a of the back pad 12; (2) a central lower cover part 131b corresponding to the central lower portion 121b of the back pad 12; (3) a bank cover part 132 corresponding to a seat surface side of the bank portion 122 of the back pad 12; (4) a side cover part 133 that covers an upper portion and left and right side portions of the back pad 12 and is coupled to the central upper cover part 131a and the bank cover part 132; and (5) a rear cover part 134 that covers a rear portion of the back pad 12 and is coupled to the side cover part 133. Only the bank cover part 132 is provided in a right and left pair.

Figure 3:
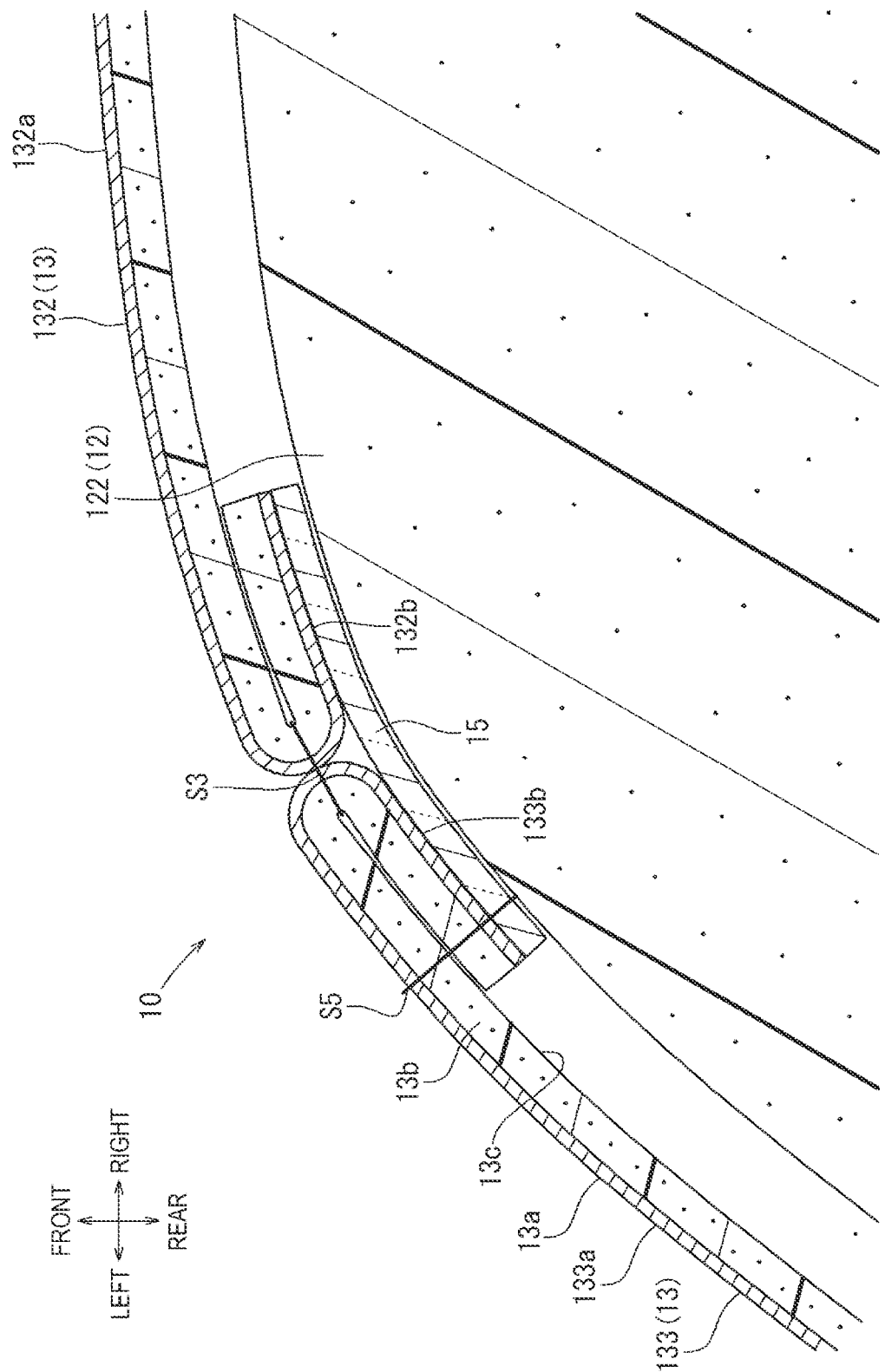
FIG. 3 is an enlarged view of a portion III in FIG. 2.
Figure 4:
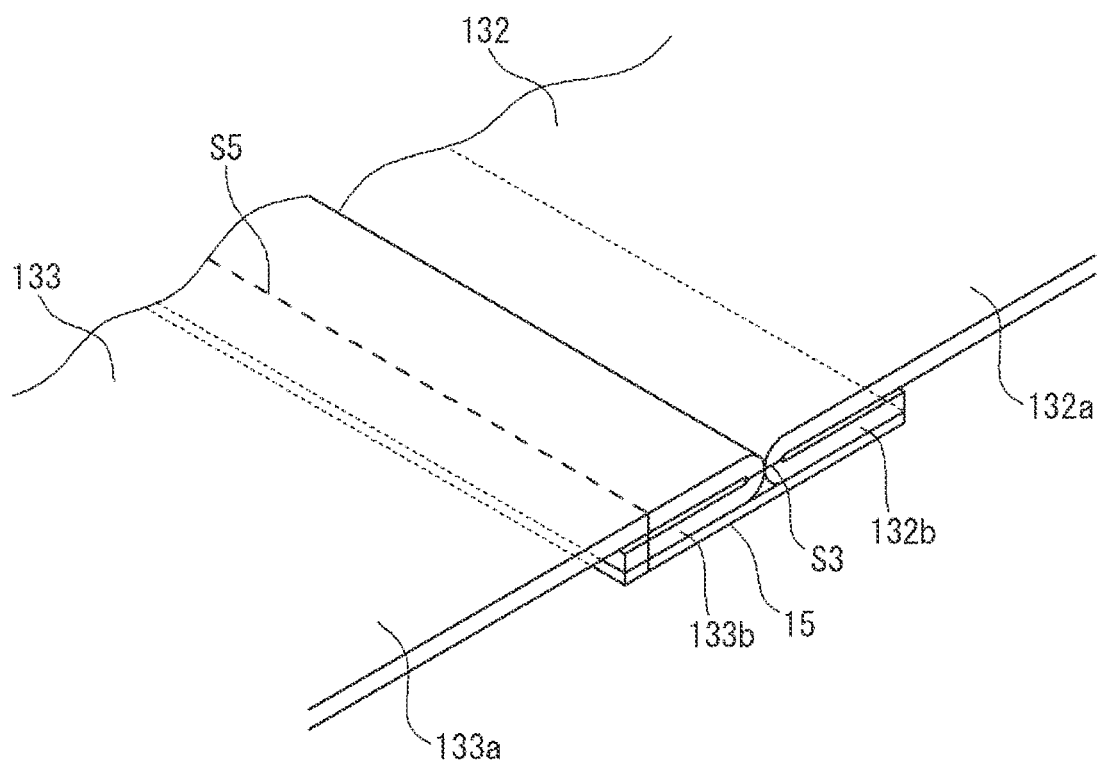
FIG. 4 is a perspective view of a sewing line portion of a seat cover in FIG. 3 when viewed from outside.
Figure 5:
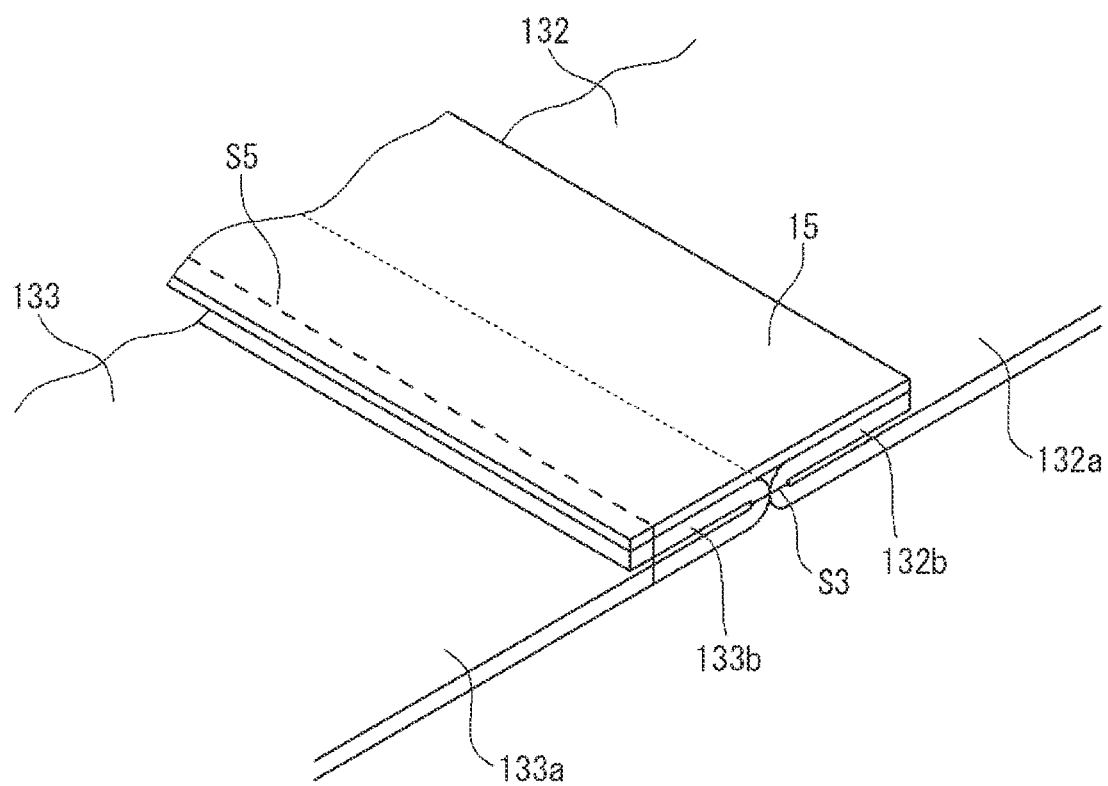
FIG. 5 is a perspective view of the sewing line portion of the seat cover in FIG. 3 when viewed from inside.

As illustrated in FIGS. 1 to 3, the central upper cover part 131a and the central lower cover part 131b are sewn by a sewing line S1, and the central upper cover part 131a, the central lower cover part 131b, and the bank cover part 132 are sewn by a sewing line S2. The central upper cover part 131a, the bank cover part 132, and the side cover part 133 are sewn by a sewing line S3. The side cover part 133 and the rear cover part 134 are sewn by a sewing line S4. The sewing line S1 is suspended and fixed to a suspended groove (not illustrated) extending in a left-right direction of the back pad 12, and the sewing line S2 is suspended and fixed to a suspended groove 122a extending in an upper-lower direction of the back pad 12. A method for suspending and fixing a sewing line is a known method for locking a wire attached to a suspended cotton cloth to a wire inserted into the back pad 12 with a hollow ring or the like, and a detailed description thereof will be omitted.

Figure 6:
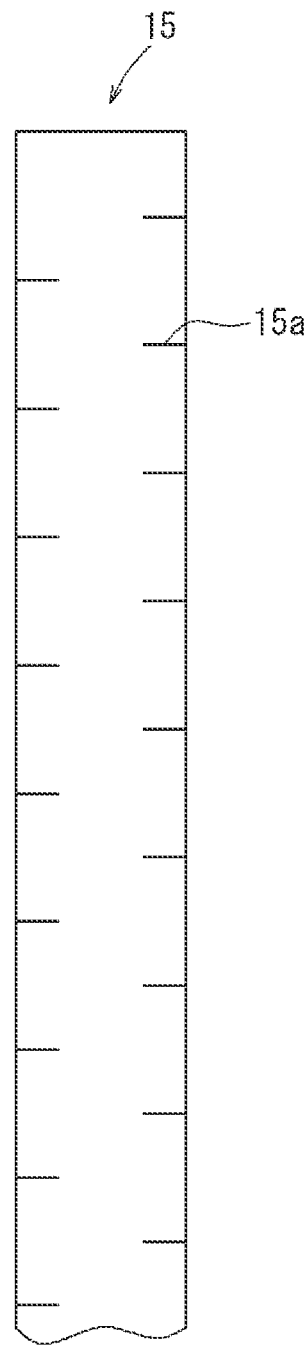
FIG. 6 is a plan view of a belt-shaped plate provided with slits.

A part of the sewing line S3 is located in front of a position where the airbag 14b of the airbag module 14 is disposed. As well illustrated in FIG. 3, the side cover part 133 is sewn to the bank cover part 132 by the sewing line S3, and then a seam allowance 133b is folded back at the sewing line S3 relative to a main body 133a so that the back base cloth 13c in the seam allowance 133b abuts against the back base cloth 13c in the main body 133a. In this state, a resin plate 15 that is a belt-shaped plate member is superposed on the surface cover 13a of the seam allowance 133b and is integrated with the surface cover 13a by an outline stitch S5. After the bank cover part 132 is sewn to the side cover part 133 by the sewing line S3, a seam allowance 132b is folded back at the sewing line S3 relative to a main body 132a so that the back base cloth 13c of the seam allowance 132b abuts against the back base cloth 13c of the main body 132a. In this state, the resin plate 15 is superposed on the surface cover 13a of the seam allowance 132b so that the sewn allowance 132b is maintained abutted against the main body 132a. The resin plate 15 has a width dimension summing a width dimension of the seam allowance 133b and a width dimension of the seam allowance 132b, and extends along the sewing line S3. The resin plate 15 is a belt-shaped plate member of soft PVC and has such rigidity that the resin plate 15 is sewable and can be maintained in a state where the seam allowance 132b abuts against the main body 132a. As illustrated in FIG. 6, when a plurality of slits 15a extending in a direction perpendicular to an extending direction of the resin plate 15 are provided at predetermined intervals, the resin plate 15 easily follow the sewing line S3 in a case where the sewing line S3 is a curving line. The length of the slit 15a may be about ¼ to ½ of the width dimension of the resin plate 15. The slits 15a may be provided on both sides of the resin plate 15 in a width direction, or be provided at least on a round outer side of a curving line. Here, the sewing line S3 and the resin plate 15 correspond to a "sewing line" and a "belt-shaped plate" in the claims, respectively. The side cover part 133 and the bank cover part 132 correspond to a "first part" and a "second part" in the claims, respectively. The seam allowance 133b and the seam allowance 132b correspond to a "first seam allowance" and a "second seam allowance" in the claims, respectively. The main body 133a and the main body 132a correspond to a "first main body" and a "second main body" in the claims, respectively.

The back cover 13 configured as above is covered on the back pad 12 attached to the back frame 11. In such a state, the seam allowance 132b of the bank cover part 132 is maintained pressed against the main body 132a by the resin plate 15. Accordingly, the seam allowance 132b can be avoided from being disposed on a side cover part 133 side beyond the sewing line S3, and a bank cover part 132 side and a side cover part 133 side of the sewing line S3 can be avoided from rising. When the airbag 14b of the airbag module 14 starts to expand in a state where the back cover 13 is covered on the back pad 12 attached to the back frame 11, stress is concentrated in the groove 125 that is a weakened portion on the back surface of the back pad 12 and the back pad 12 starts to tear from the groove 125. Next, a force accompanying the expansion of the airbag 14b is applied to the sewing line S3 of the back cover 13 via the resin plate 15 and the sewing line S3 starts to tear. At this time, the resin plate 15 is coupled only to the side cover part 133 by the outline stitch S5, and accordingly does not interfere with the tearing of the sewing line S3.

A procedure for manufacturing the seat back 10 will be described. First, a plurality of surface cover member parts are sewn to manufacture the bag-shaped back cover 13. In this first step, the side cover part 133 and the bank cover part 132 are sewn with the sewing line S3. Next, the seam allowance 133b is folded back at the sewing line S3 relative to the main body 133a so that the back base cloth 13c of the seam allowance 133b abuts against the back base cloth 13c of the main body 133a. In this state, the resin plate 15 is superposed on the surface cover 13a of the seam allowance 133b and is integrated with the main body 133a by the outline stitch S5. This step is a second step. Finally, the seam allowance 132b is folded back at the sewing line S3 relative to the main body 132a so that the back base cloth 13c of the seam allowance 132b abuts against the back base cloth 13c of the main body 132a. In this state, the resin plate 15 is superposed on the surface cover 13a of the seam allowance 132b so that the sewn allowance 132b is maintained abutted against the main body 132a. The back cover 13 in this state is covered on the back pad 12 attached to the back frame 11. This step is a third step.

The present embodiment configured as described above has the following advantageous effects. The back cover 13 is covered on the back pad 12 in the state where the seam allowance 132b of the bank cover part 132 is pressed against the main body 132a by the resin plate 15. Accordingly, the seam allowance 132b is disposed with no constraints in the periphery of the sewing line S3 between the seam allowance 132b and the back pad 12, so that a peripheral edge portion of the sewing line S3 does not irregularly rise to impair the appearance quality. Specifically, the seam allowance 132b can be avoided from being disposed between the side cover part 133 and the back pad 12 and between the bank cover part 132 and the back pad 12, and thus, the side cover part 133 side and the bank cover part 132 side of the sewing line S3 can be avoided from rising.

An end portion of the resin plate 15 that is closer to the seam allowance 132b than the seam allowance 132a is located at a position corresponding to an end portion of the seam allowance 132b. That is, the resin plate 15 has a width dimension just sufficient to press the seam allowance 132b toward the main body 132a to abut the seam allowance 132b against the main body 132a. Accordingly, the resin plate 15 can be prevented from interfering with the operation of tearing the sewing line S3 when the airbag 14b expands.

Further, by providing the plurality of slits 15a on at least one side of the resin plate 15 at predetermined intervals, the plurality of slits 15a can be easily deformed along the sewing line S3 when the sewing line S3 is a curving line and the appearance quality can be prevented from deteriorating.

The manufacturing of the seat back 10 includes three steps. In the first step, the side cover part 133 and the bank cover part 132 are sewn with the sewing line S3. In the second step, in a state where the seam allowance 133b is folded back relative to the main body 133a, the resin plate 15 is superposed on the surface cover 13a of the seam allowance 133b and is integrated with the main body 133a by the outline stitch S5. In the third step, in a state where the seam allowance 132b is folded back relative to the main body 132a, the back cover 13 is covered on the back pad 12 so that the seam allowance 132b abuts against the main body 132a by the resin plate 15. Accordingly, the seat back 10 can be manufactured rationally.

Although a specific embodiment has been described above, the present disclosure is not limited to appearances and configurations in the embodiment and various modifications, additions, and deletions may be made without changing the spirit of the present disclosure. Examples thereof include the following matters.

1. In the above embodiment, the present disclosure is applied to the seat back 10 of the automobile seat 1. However, the present disclosure is not limited thereto and may be applied to the seat cushion 2.

2. In the above embodiment, the end portion of the resin plate 15 that is closer to the seam allowance 132b than the seam allowance 132a is located at a position corresponding to the end portion of the seam allowance 132b. However, the present disclosure is not limited thereto, and if the seam allowance 132b can be maintained folded back to abut against the main body 132a, the end portion of the resin plate 15 on the seam allowance 132b side may be located in a position between the sewing line S3 and the end portion of the seam allowance 132b.

3. In the above embodiment, the belt-shaped plate is configured as the resin plate 15 that is a belt-shaped member of soft PVC. However, the present disclosure is not limited thereto, and if the belt-shaped plate has such rigidity that the belt-shaped plate is sewable and the seam allowance 132b can be maintained abutted against the main body 132a, the belt-shaped plate may be made of another resin, a carpet material, a press felt material, a fabric material, or the like.

4. In the above embodiment, a modified example is presented in which the plurality of slits 15a are provided at predetermined intervals on the resin plate 15, and the slit 15a may be a rectangular notch, a triangular notch, a semicircular notch, or the like having a certain width. Further, the resin plate 15 may curve along the sewing line S3 when the sewing line S3 is a curving line.

5. In the above embodiment, the present disclosure is applied to an automobile seat. However, the present disclosure is not limited thereto and can also be applied to a seat on a railroad vehicle, a ship, an airplane, or the like.

What is claimed is:

1. A vehicle seat comprising:
   a seat pad that is a cushion body; and
   a seat cover including a plurality of parts that cover the seat pad and that are integrated as a single part, the plurality of parts including a first part and a second part, the seat cover including a portion provided with:

a sewing line that sews the first part and the second part together; and an outline stitch that extends in parallel to the sewing line and that is located on one side of the sewing line, wherein the first part includes a first main body and a first seam allowance that is a seam allowance at the sewing line, and the second part includes a second main body and a second seam allowance that is a seam allowance at the sewing line, wherein a belt-shaped plate is sewn to the first seam allowance and the first main body by the outline stitch in a position on an end side of the first seam allowance relative to the sewing line, and wherein the seat pad is covered with the seat cover in a state where the belt-shaped plate extends beyond the sewing line from the end side of the first seam allowance toward the second part and where the belt-shaped plate presses the second seam allowance to abut against the second main body.

2. The vehicle seat according to claim 1, further comprising:

an airbag disposed inside the seat pad, wherein the sewing line is configured to be torn by expansion of the airbag, and wherein an end portion of the belt-shaped plate that is closer to the second seam allowance than the first seam allowance is located between the sewing line and an end portion of the second seam allowance.

3. The vehicle seat according to claim 2, wherein the end portion of the belt-shaped plate that is closer to the second seam allowance than the first seam allowance is located at a position corresponding to the end portion of the second seam allowance.

4. The vehicle seat according to claim 1, wherein the sewing line and the outline stitch extend in parallel to each other in a curving shape, and wherein a plurality of slits extending in a direction perpendicular to an extending direction of the belt-shaped plate are provided on at least one side of the belt-shaped plate at predetermined intervals.

5. The vehicle seat according to claim 1, wherein the belt-shaped plate is not sewn to the second part.

6. A method for manufacturing a vehicle seat including a seat pad that is a cushion body and a seat cover having a plurality of parts that cover the seat pad and that are integrated as a single part, the plurality of parts including a first part and a second part, the method comprising:

sewing the first part and the second part together with a sewing line at a portion of the seat cover, the first part including a first main body and a first seam allowance that is a seam allowance at the sewing line, the second part including a second main body and a second seam allowance that is a seam allowance at the sewing line;

providing an outline stitch that sews a belt-shaped plate to the first seam allowance and the first main body in a position on an end side of the first seam allowance relative to the sewing line, the belt-shaped plate being sewn in parallel with the sewing line; and covering the seat pad with the seat cover in a state where the belt-shaped plate extends beyond the sewing line from the end side of the first seam allowance toward the second part and where the belt-shaped plate presses the second seam allowance to abut against the second main body.

* * * * *